United States Patent
Ponziani

(10) Patent No.: US 6,876,300 B2
(45) Date of Patent: Apr. 5, 2005

(54) ELECTRONIC INTELLIGENT TURN SIGNAL CONTROL SYSTEM

(76) Inventor: Richard L. Ponziani, 1958 Home Path Ct., Centerville, OH (US) 45459

(*) Notice: Subject to any disclaimer, the term of this patent is extended or adjusted under 35 U.S.C. 154(b) by 28 days.

(21) Appl. No.: 10/303,574

(22) Filed: Nov. 25, 2002

(65) Prior Publication Data

US 2004/0100373 A1 May 27, 2004

(51) Int. Cl.[7] .................................................. B60Q 1/40
(52) U.S. Cl. ..................... 340/476; 340/475; 362/498; 162/36; 701/41; 701/42
(58) Field of Search ............................. 340/475, 476; 362/498; 116/36; 701/36, 41, 42

(56) References Cited

U.S. PATENT DOCUMENTS

| | | | |
|---|---|---|---|
| 4,638,290 A | | 1/1987 | Wagner |
| 4,962,366 A | | 10/1990 | Hatanaka et al. |
| 5,030,802 A | | 7/1991 | Noro |
| 5,136,516 A | * | 8/1992 | Twombly ..................... 701/20 |
| 5,309,143 A | | 5/1994 | Brown |
| 5,528,218 A | | 6/1996 | Rigsby |
| 5,581,235 A | | 12/1996 | Hollstein |
| 5,712,618 A | * | 1/1998 | McKenna ................... 340/475 |
| 5,786,754 A | | 7/1998 | Parker |
| 5,790,017 A | | 8/1998 | Berryhill |
| 5,808,545 A | | 9/1998 | Brueggemann et al. |
| 5,850,177 A | * | 12/1998 | Zimmerman ................ 340/479 |
| 5,936,215 A | | 8/1999 | Masuda |
| 5,944,393 A | * | 8/1999 | Sano .......................... 303/146 |
| 6,020,813 A | | 2/2000 | Harris |
| 6,031,451 A | | 2/2000 | Graves et al. |
| 6,034,600 A | | 3/2000 | Browne et al. |
| 6,069,559 A | | 5/2000 | Davis et al. |
| 6,194,676 B1 | | 2/2001 | Takahashi |
| 6,204,759 B1 | | 3/2001 | Jahnke |
| 6,208,921 B1 | * | 3/2001 | Tsunehara et al. ............ 701/41 |
| 6,278,362 B1 | * | 8/2001 | Yoshikawa et al. ......... 340/439 |
| 6,313,742 B1 | * | 11/2001 | Larson ....................... 340/442 |
| 6,356,189 B1 | * | 3/2002 | Fujimaki .................... 340/465 |
| 6,462,480 B1 | * | 10/2002 | Tornare ....................... 315/83 |
| 6,483,430 B2 | * | 11/2002 | Okuda et al. ................ 340/476 |
| 6,577,937 B1 | * | 6/2003 | Shuman et al. ............... 701/48 |
| 2002/0036567 A1 | | 3/2002 | Larson |
| 2003/0025597 A1 | * | 2/2003 | Schofield .................... 340/435 |
| 2003/0067762 A1 | * | 4/2003 | Fukawa ...................... 362/37 |

* cited by examiner

*Primary Examiner*—Jeffrey Hofsass
*Assistant Examiner*—Samuel J. Walk
(74) *Attorney, Agent, or Firm*—Dinsmore & Shohl LLP

(57) ABSTRACT

An intelligent turn signal control system for turning on and off left and right turn signals in a vehicle includes a computer, such as an antilock braking system computer, with programmed software operably disposed on a vehicle, a driver interface switch assembly as input to the computer. Two or more wheel speed sensors transmit differential wheel movement data as input to the computer, a circuit drives turn signal indicator lamps from conditionally computed output data from the computer to turn on and off turn signals in a situation-appropriate manner. Upon turn signal indication intent data input from the driver, extensive travel and turn data is computed, including yaw rotation and steering system position to turn off or cancel the turn signal at the appropriate point.

34 Claims, 12 Drawing Sheets

FIG. 6
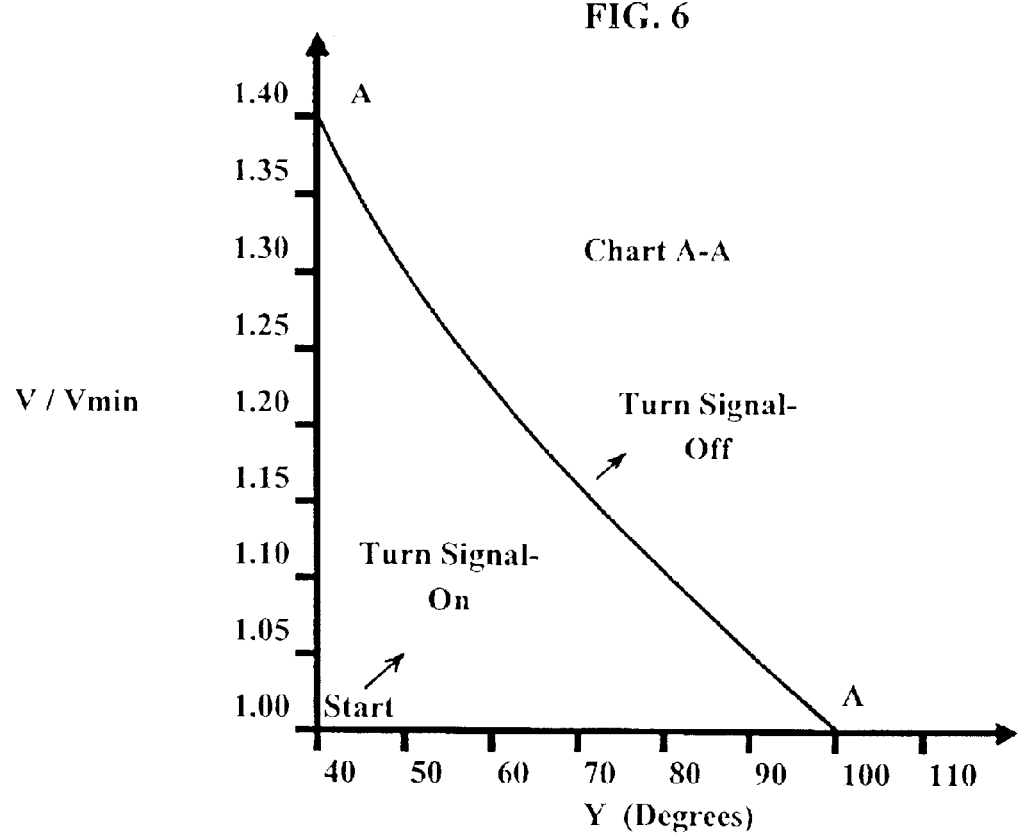
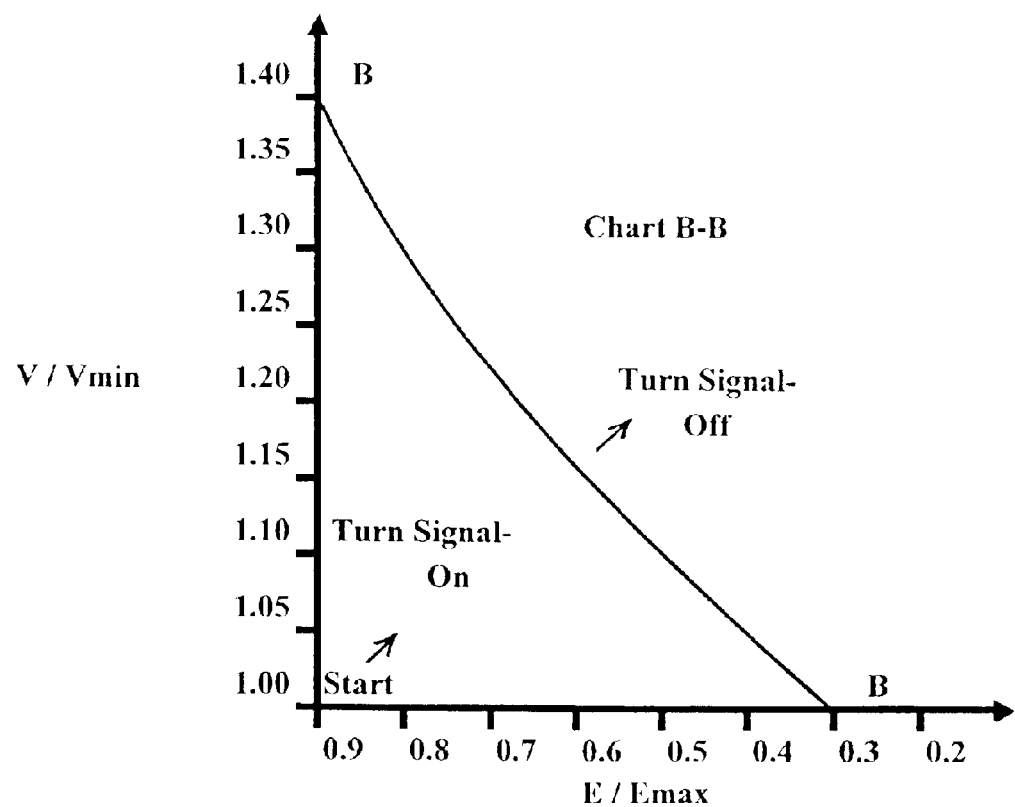

Fig. 7
Turn Type A
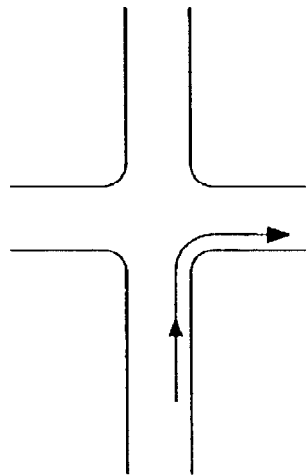
Turn Type B
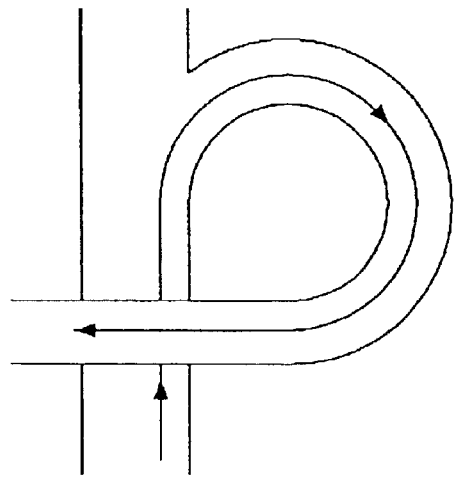
Turn Type C
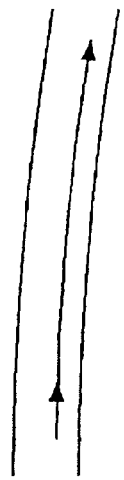
Turn Type D
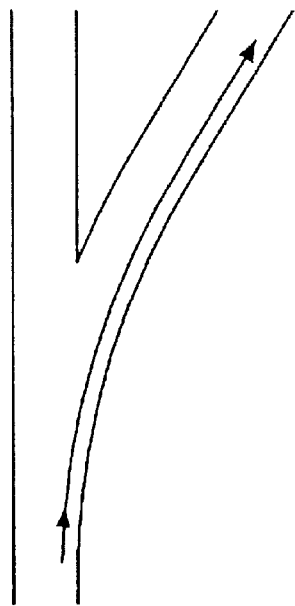
Turn Type E
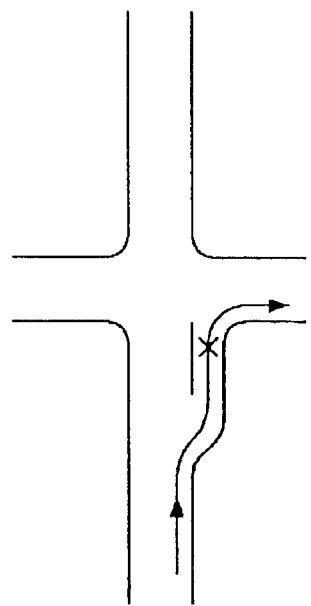

FIG. 8
Turn Type A, Right Hand Turn

| | INPUT DATA | | | COMPUTED DATA | | | | | |
|---|---|---|---|---|---|---|---|---|---|
| Time (sec) | L (# of pulses) | R (# of pulses) | Vehicle Velocity (mph) | L/R | P (total # pulses) | S (total # pulses) | P-S (total) | Yaw turn (P-S) x K (degrees) | G |
| 0 | 0 | 0 | 0 | 0.00 | 0 | 0 | 0 | 0 | 0.00 |
| 0.5 | 225 | 225 | 45 | 1.00 | 225 | 225 | 0 | 0 | 0.00 |
| 1 | 225 | 225 | 45 | 1.00 | 450 | 450 | 0 | 0 | 0.00 |
| 1.5 | 225 | 225 | 45 | 1.00 | 675 | 675 | 0 | 0 | 0.00 |
| 2 | 215 | 215 | 43 | 1.00 | 890 | 890 | 0 | 0 | 0.00 |
| 2.5 | 200 | 200 | 40 | 1.00 | 1090 | 1090 | 0 | 0 | 0.00 |
| 3 | 185 | 185 | 37 | 1.00 | 1275 | 1275 | 0 | 0 | 0.00 |
| 3.5 | 165 | 165 | 33 | 1.00 | 1440 | 1440 | 0 | 0 | 0.00 |
| 4 | 150 | 150 | 30 | 1.00 | 1590 | 1590 | 0 | 0 | 0.00 |
| 4.5 | 135 | 132 | 27 | 1.02 | 1725 | 1722 | 3 | 5 | 0.21 |
| 5 | 125 | 119 | 24 | 1.05 | 1850 | 1841 | 9 | 15 | 0.38 |
| 5.5 | 115 | 107 | 22 | 1.07 | 1965 | 1948 | 17 | 28 | 0.46 |
| 6 | 110 | 102 | 21 | 1.08 | 2075 | 2050 | 25 | 42 | 0.44 |
| 6.5 | 110 | 102 | 21 | 1.08 | 2185 | 2152 | 33 | 55 | 0.44 |
| 7 | 122 | 114 | 24 | 1.07 | 2307 | 2266 | 41 | 69 | 0.49 |
| 7.5 | 140 | 133 | 27 | 1.05 | 2447 | 2399 | 48 | 80 | 0.50 |
| 8 | 150 | 146 | 30 | 1.03 | 2597 | 2545 | 52 | 87 | 0.31 |
| 8.5 | 155 | 154 | 31 | 1.01 | 2752 | 2699 | 53 | 89 | 0.08 |
| 9 | 165 | 164 | 33 | 1.01 | 2917 | 2863 | 54 | 90 | 0.09 |
| 9.5 | 175 | 175 | 35 | 1.00 | 3092 | 3038 | 54 | 90 | 0.00 |
| 10 | 190 | 190 | 38 | 1.00 | 3282 | 3228 | 54 | 90 | 0.00 |
| 10.5 | 205 | 205 | 41 | 1.00 | 3487 | 3433 | 54 | 90 | 0.00 |
| 11 | 215 | 215 | 43 | 1.00 | 3702 | 3648 | 54 | 90 | 0.00 |
| 11.5 | 220 | 220 | 44 | 1.00 | 3922 | 3868 | 54 | 90 | 0.00 |
| 12 | 220 | 220 | 44 | 1.00 | 4142 | 4088 | 54 | 90 | 0.00 |
| 12.5 | 220 | 220 | 44 | 1.00 | 4362 | 4308 | 54 | 90 | 0.00 |
| 13 | 220 | 220 | 44 | 1.00 | 4582 | 4528 | 54 | 90 | 0.00 |
| 13.5 | 220 | 220 | 44 | 1.00 | 4802 | 4748 | 54 | 90 | 0.00 |
| 14 | 220 | 220 | 44 | 1.00 | 5022 | 4968 | 54 | 90 | 0.00 |
| 14.5 | 220 | 220 | 44 | 1.00 | 5242 | 5188 | 54 | 90 | 0.00 |
| 15 | 220 | 220 | 44 | 1.00 | 5462 | 5408 | 54 | 90 | 0.00 |
| 15.5 | 220 | 220 | 44 | 1.00 | 5682 | 5628 | 54 | 90 | 0.00 |
| 16 | 220 | 220 | 44 | 1.00 | 5902 | 5848 | 54 | 90 | 0.00 |
| 16.5 | 220 | 220 | 44 | 1.00 | 6122 | 6068 | 54 | 90 | 0.00 |
| 17 | 220 | 220 | 44 | 1.00 | 6342 | 6288 | 54 | 90 | 0.00 |
| 17.5 | 220 | 220 | 44 | 1.00 | 6562 | 6508 | 54 | 90 | 0.00 |
| 18 | 220 | 220 | 44 | 1.00 | 6782 | 6728 | 54 | 90 | 0.00 |

60" track width (T); 96" wheel base (W); 45 tooth tone wheel; 6.6 ft. wheel circumference; 2.5 turns, steering wheel lock to lock; 37 ft. vehicle turn radius, curb to curb

FIG. 9
Turn Type B, Cloverleaf Entrance to Highway

| | INPUT DATA | | | | COMPUTED DATA | | | | |
|---|---|---|---|---|---|---|---|---|---|
| Time (sec) | L (# of pulses) | R (# of pulses) | Vehicle Velocity (mph) | L/R | P (total # pulses) | S (total # pulses) | P-S (total) | Yaw turn (P-S) x K (degrees) | G |
| 0 | 0 | 0 | 0 | 0.00 | 0 | 0 | 0 | | 0.00 |
| 0.5 | 225 | 225 | 45 | 1.00 | 225 | 225 | 0 | 0 | 0.00 |
| 1 | 225 | 225 | 45 | 1.00 | 450 | 450 | 0 | 0 | 0.00 |
| 1.5 | 225 | 225 | 45 | 1.00 | 675 | 675 | 0 | 0 | 0.00 |
| 2 | 215 | 215 | 43 | 1.00 | 890 | 890 | 0 | 0 | 0.00 |
| 2.5 | 200 | 200 | 40 | 1.00 | 1090 | 1090 | 0 | 0 | 0.00 |
| 3 | 185 | 185 | 37 | 1.00 | 1275 | 1275 | 0 | 0 | 0.00 |
| 3.5 | 165 | 163 | 33 | 1.01 | 1440 | 1438 | 2 | 3 | 0.18 |
| 4 | 150 | 146 | 30 | 1.03 | 1590 | 1584 | 6 | 10 | 0.31 |
| 4.5 | 150 | 144 | 29 | 1.04 | 1740 | 1728 | 12 | 20 | 0.46 |
| 5 | 150 | 142 | 29 | 1.06 | 1890 | 1870 | 20 | 34 | 0.61 |
| 5.5 | 150 | 142 | 29 | 1.06 | 2040 | 2012 | 28 | 47 | 0.61 |
| 6 | 150 | 142 | 29 | 1.06 | 2190 | 2154 | 36 | 60 | 0.61 |
| 6.5 | 150 | 142 | 29 | 1.06 | 2340 | 2296 | 44 | 74 | 0.61 |
| 7 | 150 | 142 | 29 | 1.06 | 2490 | 2438 | 52 | 87 | 0.61 |
| 7.5 | 150 | 142 | 29 | 1.06 | 2640 | 2580 | 60 | 101 | 0.61 |
| 8 | 150 | 142 | 29 | 1.06 | 2790 | 2722 | 68 | 114 | 0.61 |
| 8.5 | 150 | 142 | 29 | 1.06 | 2940 | 2864 | 76 | 127 | 0.61 |
| 9 | 150 | 142 | 29 | 1.06 | 3090 | 3006 | 84 | 141 | 0.61 |
| 9.5 | 150 | 142 | 29 | 1.06 | 3240 | 3148 | 92 | 154 | 0.61 |
| 10 | 150 | 142 | 29 | 1.06 | 3390 | 3290 | 100 | 168 | 0.61 |
| 10.5 | 150 | 142 | 29 | 1.06 | 3540 | 3432 | 108 | 181 | 0.61 |
| 11 | 150 | 142 | 29 | 1.06 | 3690 | 3574 | 116 | 194 | 0.61 |
| 11.5 | 150 | 142 | 29 | 1.06 | 3840 | 3716 | 124 | 208 | 0.61 |
| 12 | 150 | 142 | 29 | 1.06 | 3990 | 3858 | 132 | 221 | 0.61 |
| 12.5 | 150 | 142 | 29 | 1.06 | 4140 | 4000 | 140 | 235 | 0.61 |
| 13 | 150 | 142 | 29 | 1.06 | 4290 | 4142 | 148 | 248 | 0.61 |
| 13.5 | 166 | 159 | 33 | 1.04 | 4456 | 4301 | 155 | 260 | 0.60 |
| 14 | 185 | 180 | 37 | 1.03 | 4641 | 4481 | 160 | 268 | 0.48 |
| 14.5 | 208 | 207 | 42 | 1.00 | 4849 | 4688 | 161 | 270 | 0.11 |
| 15 | 232 | 232 | 46 | 1.00 | 5081 | 4920 | 161 | 270 | 0.00 |
| 15.5 | 253 | 253 | 51 | 1.00 | 5334 | 5173 | 161 | 270 | 0.00 |
| 16 | 268 | 268 | 54 | 1.00 | 5602 | 5441 | 161 | 270 | 0.00 |
| 16.5 | 275 | 275 | 55 | 1.00 | 5877 | 5716 | 161 | 270 | 0.00 |
| 17 | 275 | 275 | 55 | 1.00 | 6152 | 5991 | 161 | 270 | 0.00 |
| 17.5 | 275 | 275 | 55 | 1.00 | 6427 | 6266 | 161 | 270 | 0.00 |
| 18 | 275 | 275 | 55 | 1.00 | 6702 | 6541 | 161 | 270 | 0.00 |

60" track width (T); 96" wheel base (W); 45 tooth tone wheel; 6.6 ft. wheel circumference; 2.5 turns, steering wheel lock to lock; 37 ft. vehicle turn radius, curb to curb

FIG. 10
Turn Type C, Gradual Right Bend

| | INPUT DATA | | | | COMPUTED DATA | | | | |
|---|---|---|---|---|---|---|---|---|---|
| Time (sec) | L (# of pulses) | R (# of pulses) | Vehicle Velocity (mph) | L/R | P (total # pulses) | S (total # pulses) | P-S (total) | Yaw turn (P-S) x K (degrees) | G |
| 0 | 0 | 0 | 0 | 0.00 | 0 | 0 | 0 | 0 | 0.00 |
| 0.5 | 325 | 324 | 65 | 1.00 | 325 | 324 | 1 | 2 | 0.17 |
| 1 | 325 | 324 | 65 | 1.00 | 650 | 648 | 2 | 3 | 0.17 |
| 1.5 | 325 | 324 | 65 | 1.00 | 975 | 972 | 3 | 5 | 0.17 |
| 2 | 325 | 324 | 65 | 1.00 | 1300 | 1296 | 4 | 7 | 0.17 |
| 2.5 | 325 | 324 | 65 | 1.00 | 1625 | 1620 | 5 | 8 | 0.17 |
| 3 | 325 | 324 | 65 | 1.00 | 1950 | 1944 | 6 | 10 | 0.17 |
| 3.5 | 325 | 324 | 65 | 1.00 | 2275 | 2268 | 7 | 12 | 0.17 |
| 4 | 325 | 324 | 65 | 1.00 | 2600 | 2592 | 8 | 13 | 0.17 |
| 4.5 | 325 | 324 | 65 | 1.00 | 2925 | 2916 | 9 | 15 | 0.17 |
| 5 | 325 | 324 | 65 | 1.00 | 3250 | 3240 | 10 | 17 | 0.17 |
| 5.5 | 325 | 324 | 65 | 1.00 | 3575 | 3564 | 11 | 18 | 0.17 |
| 6 | 325 | 324 | 65 | 1.00 | 3900 | 3888 | 12 | 20 | 0.17 |
| 6.5 | 325 | 324 | 65 | 1.00 | 4225 | 4212 | 13 | 22 | 0.17 |
| 7 | 325 | 324 | 65 | 1.00 | 4550 | 4536 | 14 | 23 | 0.17 |
| 7.5 | 325 | 324 | 65 | 1.00 | 4875 | 4860 | 15 | 25 | 0.17 |
| 8 | 325 | 324 | 65 | 1.00 | 5200 | 5184 | 16 | 27 | 0.17 |
| 8.5 | 325 | 324 | 65 | 1.00 | 5525 | 5508 | 17 | 28 | 0.17 |
| 9 | 325 | 324 | 65 | 1.00 | 5850 | 5832 | 18 | 30 | 0.17 |
| 9.5 | 325 | 324 | 65 | 1.00 | 6175 | 6156 | 19 | 32 | 0.17 |
| 10 | 325 | 324 | 65 | 1.00 | 6500 | 6480 | 20 | 34 | 0.17 |
| 10.5 | 325 | 324 | 65 | 1.00 | 6825 | 6804 | 21 | 35 | 0.17 |
| 11 | 325 | 324 | 65 | 1.00 | 7150 | 7128 | 22 | 37 | 0.17 |
| 11.5 | 325 | 324 | 65 | 1.00 | 7475 | 7452 | 23 | 39 | 0.17 |
| 12 | 325 | 324 | 65 | 1.00 | 7800 | 7776 | 24 | 40 | 0.17 |
| 12.5 | 325 | 324 | 65 | 1.00 | 8125 | 8100 | 25 | 42 | 0.17 |
| 13 | 325 | 324 | 65 | 1.00 | 8450 | 8424 | 26 | 44 | 0.17 |
| 13.5 | 325 | 324 | 65 | 1.00 | 8775 | 8748 | 27 | 45 | 0.17 |
| 14 | 325 | 324 | 65 | 1.00 | 9100 | 9072 | 28 | 47 | 0.17 |
| 14.5 | 325 | 324 | 65 | 1.00 | 9425 | 9396 | 29 | 49 | 0.17 |
| 15 | 325 | 324 | 65 | 1.00 | 9750 | 9720 | 30 | 50 | 0.17 |
| 15.5 | 325 | 324 | 65 | 1.00 | 10075 | 10044 | 31 | 52 | 0.17 |
| 16 | 325 | 324 | 65 | 1.00 | 10400 | 10368 | 32 | 54 | 0.17 |
| 16.5 | 325 | 324 | 65 | 1.00 | 10725 | 10692 | 33 | 55 | 0.17 |
| 17 | 325 | 324 | 65 | 1.00 | 11050 | 11016 | 34 | 57 | 0.17 |
| 17.5 | 325 | 324 | 65 | 1.00 | 11375 | 11340 | 35 | 59 | 0.17 |
| 18 | 325 | 324 | 65 | 1.00 | 11700 | 11664 | 36 | 60 | 0.17 |

60 " track width (T); 96" wheel base (W); 45 tooth tone wheel; 6.6 ft. wheel circumference; 2.5 turns, steering wheel lock to lock; 37 ft. vehicle turn radius, curb to curb

FIG. 11
Turn Type D, Right Y Turn

| | INPUT DATA | | COMPUTED DATA | | | | | | |
|---|---|---|---|---|---|---|---|---|---|
| Time (sec) | L (# of pulses) | R (# of pulses) | Vehicle Velocity (mph) | L/R | P (total # pulses) | S (total # pulses) | P-S (total) | Yaw turn (P-S) x K (degrees) | G |
| 0 | 0 | 0 | 0 | 0.00 | 0 | 0 | 0 | 0 | 0.00 |
| 0.5 | 225 | 225 | 45 | 1.00 | 225 | 225 | 0 | 0 | 0.00 |
| 1 | 225 | 225 | 45 | 1.00 | 450 | 450 | 0 | 0 | 0.00 |
| 1.5 | 225 | 225 | 45 | 1.00 | 675 | 675 | 0 | 0 | 0.00 |
| 2 | 215 | 215 | 43 | 1.00 | 890 | 890 | 0 | 0 | 0.00 |
| 2.5 | 200 | 200 | 40 | 1.00 | 1090 | 1090 | 0 | 0 | 0.00 |
| 3 | 196 | 195 | 39 | 1.01 | 1286 | 1285 | 1 | 2 | 0.10 |
| 3.5 | 191 | 190 | 38 | 1.01 | 1477 | 1475 | 2 | 3 | 0.10 |
| 4 | 186 | 185 | 37 | 1.01 | 1663 | 1660 | 3 | 5 | 0.10 |
| 4.5 | 186 | 185 | 37 | 1.01 | 1849 | 1845 | 4 | 7 | 0.10 |
| 5 | 186 | 185 | 37 | 1.01 | 2035 | 2030 | 5 | 8 | 0.10 |
| 5.5 | 186 | 185 | 37 | 1.01 | 2221 | 2215 | 6 | 10 | 0.10 |
| 6 | 186 | 185 | 37 | 1.01 | 2407 | 2400 | 7 | 12 | 0.10 |
| 6.5 | 188 | 187 | 38 | 1.01 | 2595 | 2587 | 8 | 13 | 0.10 |
| 7 | 190 | 189 | 38 | 1.01 | 2785 | 2776 | 9 | 15 | 0.10 |
| 7.5 | 190 | 190 | 38 | 1.00 | 2975 | 2966 | 9 | 15 | 0.00 |
| 8 | 193 | 193 | 39 | 1.00 | 3168 | 3159 | 9 | 15 | 0.00 |
| 8.5 | 195 | 195 | 39 | 1.00 | 3363 | 3354 | 9 | 15 | 0.00 |
| 9 | 200 | 200 | 40 | 1.00 | 3563 | 3554 | 9 | 15 | 0.00 |
| 9.5 | 205 | 205 | 41 | 1.00 | 3768 | 3759 | 9 | 15 | 0.00 |
| 10 | 210 | 210 | 42 | 1.00 | 3978 | 3969 | 9 | 15 | 0.00 |
| 10.5 | 215 | 215 | 43 | 1.00 | 4193 | 4184 | 9 | 15 | 0.00 |
| 11 | 215 | 215 | 43 | 1.00 | 4408 | 4399 | 9 | 15 | 0.00 |
| 11.5 | 220 | 220 | 44 | 1.00 | 4628 | 4619 | 9 | 15 | 0.00 |
| 12 | 220 | 220 | 44 | 1.00 | 4848 | 4839 | 9 | 15 | 0.00 |
| 12.5 | 220 | 220 | 44 | 1.00 | 5068 | 5059 | 9 | 15 | 0.00 |
| 13 | 220 | 220 | 44 | 1.00 | 5288 | 5279 | 9 | 15 | 0.00 |
| 13.5 | 220 | 220 | 44 | 1.00 | 5508 | 5499 | 9 | 15 | 0.00 |
| 14 | 220 | 220 | 44 | 1.00 | 5728 | 5719 | 9 | 15 | 0.00 |
| 14.5 | 220 | 220 | 44 | 1.00 | 5948 | 5939 | 9 | 15 | 0.00 |
| 15 | 220 | 220 | 44 | 1.00 | 6168 | 6159 | 9 | 15 | 0.00 |
| 15.5 | 220 | 220 | 44 | 1.00 | 6388 | 6379 | 9 | 15 | 0.00 |
| 16 | 220 | 220 | 44 | 1.00 | 6608 | 6599 | 9 | 15 | 0.00 |
| 16.5 | 220 | 220 | 44 | 1.00 | 6828 | 6819 | 9 | 15 | 0.00 |
| 17 | 220 | 220 | 44 | 1.00 | 7048 | 7039 | 9 | 15 | 0.00 |
| 17.5 | 220 | 220 | 44 | 1.00 | 7268 | 7259 | 9 | 15 | 0.00 |
| 18 | 220 | 220 | 44 | 1.00 | 7488 | 7479 | 9 | 15 | 0.00 |

60" track width (T); 96" wheel base (W); 45 tooth tone wheel; 6.6 ft. wheel circumference; 2.5 turns, steering wheel lock to lock; 37 ft. vehicle turn radius, curb to curb

FIG. 12
Turn Type E, Merge to Right Turn Lane, Stop, Then Make Right Turn

| | INPUT DATA | | | | COMPUTED DATA | | | | |
|---|---|---|---|---|---|---|---|---|---|
| Time (sec) | L (# of pulses) | R (# of pulses) | Vehicle Velocity (mph) | L/R | P (total # pulses) | S (total # pulses) | P-S (total) | Yaw turn (P-S) x K (degrees) | G |
| 0 | 0 | 0 | 0 | 0.00 | 0 | 0 | 0 | 0 | 0.00 |
| 0.5 | 125 | 125 | 25 | 1.00 | 125 | 125 | 0 | 0 | 0.00 |
| 1 | 120 | 120 | 24 | 1.00 | 245 | 245 | 0 | 0 | 0.00 |
| 1.5 | 118 | 115 | 23 | 1.03 | 363 | 360 | 3 | 5 | 0.19 |
| 2 | 109 | 105 | 21 | 1.04 | 472 | 465 | 7 | 12 | 0.23 |
| 2.5 | 101 | 100 | 20 | 1.01 | 573 | 565 | 8 | 13 | 0.05 |
| 3 | 72 | 75 | 15 | 0.96 | 645 | 640 | 5 | 8 | -0.12 |
| 3.5 | 55 | 60 | 12 | 0.92 | 700 | 700 | 0 | 0 | -0.16 |
| 4 | 35 | 35 | 7 | 1.00 | 735 | 735 | 0 | 0 | 0.00 |
| 4.5 | 15 | 15 | 3 | 1.00 | 750 | 750 | 0 | 0 | 0.00 |
| 5 | 5 | 5 | 1 | 1.00 | 755 | 755 | 0 | 0 | 0.00 |
| 5.5 | 0 | 0 | 0 | - | 755 | 755 | 0 | 0 | 0.00 |
| 6 | 0 | 0 | 0 | - | 755 | 755 | 0 | 0 | 0.00 |
| 6.5 | 0 | 0 | 0 | - | 755 | 755 | 0 | 0 | 0.00 |
| 7 | 0 | 0 | 0 | - | 755 | 755 | 0 | 0 | 0.00 |
| 7.5 | 0 | 0 | 0 | - | 755 | 755 | 0 | 0 | 0.00 |
| 8 | 0 | 0 | 0 | - | 755 | 755 | 0 | 0 | 0.00 |
| 8.5 | 0 | 0 | 0 | - | 755 | 755 | 0 | 0 | 0.00 |
| 9 | 0 | 0 | 0 | - | 755 | 755 | 0 | 0 | 0.00 |
| 9.5 | 10 | 10 | 2 | 1.00 | 765 | 765 | 0 | 0 | 0.00 |
| 10 | 25 | 25 | 5 | 1.00 | 790 | 790 | 0 | 0 | 0.00 |
| 10.5 | 52 | 51 | 10 | 1.02 | 842 | 841 | 1 | 2 | 0.03 |
| 11 | 82 | 75 | 16 | 1.09 | 924 | 916 | 8 | 13 | 0.28 |
| 11.5 | 110 | 102 | 21 | 1.08 | 1034 | 1018 | 16 | 27 | 0.44 |
| 12 | 123 | 115 | 24 | 1.07 | 1157 | 1133 | 24 | 40 | 0.49 |
| 12.5 | 138 | 130 | 27 | 1.06 | 1295 | 1263 | 32 | 54 | 0.56 |
| 13 | 152 | 144 | 30 | 1.06 | 1447 | 1407 | 40 | 67 | 0.62 |
| 13.5 | 161 | 155 | 32 | 1.04 | 1608 | 1562 | 46 | 77 | 0.50 |
| 14 | 169 | 165 | 33 | 1.02 | 1777 | 1727 | 50 | 84 | 0.35 |
| 14.5 | 177 | 175 | 35 | 1.01 | 1954 | 1902 | 52 | 87 | 0.19 |
| 15 | 177 | 175 | 35 | 1.01 | 2131 | 2077 | 54 | 90 | 0.19 |
| 15.5 | 175 | 175 | 35 | 1.00 | 2306 | 2252 | 54 | 90 | 0.00 |
| 16 | 175 | 175 | 35 | 1.00 | 2481 | 2427 | 54 | 90 | 0.00 |
| 16.5 | 175 | 175 | 35 | 1.00 | 2656 | 2602 | 54 | 90 | 0.00 |
| 17 | 175 | 175 | 35 | 1.00 | 2831 | 2777 | 54 | 90 | 0.00 |
| 17.5 | 175 | 175 | 35 | 1.00 | 3006 | 2952 | 54 | 90 | 0.00 |
| 18 | 175 | 175 | 35 | 1.00 | 3181 | 3127 | 54 | 90 | 0.00 |

60" track width (T); 96" wheel base (W); 45 tooth tone wheel; 6.6 ft. wheel circumference; 2.5 turns, steering wheel lock to lock; 37 ft. vehicle turn radius, curb to curb

ELECTRONIC INTELLIGENT TURN SIGNAL CONTROL SYSTEM

FIELD OF THE INVENTION

This invention relates in general to electrical systems in vehicles and more particularly to control the on/off status of a turn-signal device and four way flashers.

BACKGROUND OF THE INVENTION

In a motor vehicle, traditional turn signal cancellation is achieved by a mechanism that is imbedded into the vehicle steering column. Initial activation is by hand movement of the turn signal stalk on the left side of the steering column corresponding to the direction of intent. From that point, automatic cancellation is achieved via a ratchet or latch mechanism that is initiated with a physical turning of the steering wheel. When the steering wheel is turned past a designed-in arc angle in the direction of the intended turn, and subsequently returned, a mechanism is tripped to reset the turn signal to the off position. These pre-determined arc angles are designed by the motor vehicle manufacturer and are fixed angle points within the steering column. This is the only means of automatic cancellation of the turn signal function. The turn signal on a vehicle remains active until either manually disabled by the driver or the steering wheel is turned a predetermined amount and returned.

The manual means of turn signal shut off is one of two varieties: one, where the column stalk is physically moved by hand from the turn-signal-on position to the off position by the vehicle operator. The second means is where the vehicle operator initially intends to perform a "lane change", thereby moving the column stalk from the off position to an intermediate position between turn signal on and turn signal off. This lane change position will hold the turn signal function on as long as the stalk is hand held in that position. Upon hand removal from the stalk, the turn signal is then shut off. This mode is independent of the steering wheel position or movement.

The problem with this art is that the automatic cancel feature responds to steering wheel rotation only, without regard to any other vital vehicle factors related to the execution of a turn. As a result of this information and intelligence deficiency, a turn signal left-on condition is likely and the driver may be unaware of this condition for an extended period of time while driving. Additionally, any degree of normal dither motion of the steering wheel to steer the vehicle through a turn and while the turn signal is on may cause an unintended shut off of the turn signal prior to the actual completion of the intended turn. Still other conditions may exist where automatic turn signal shut off is inappropriate or non-existent. These conditions can create situations while driving that are a nuisance or are a danger.

Prior art systems have attempted to deal with only one aspect of these shortcomings, that is, the turn signal unintentionally left on. The remedies have mostly used fixed time or fixed distance values to effect a driver alert warning of some form. If time or distance are used to automatically shut off the turn signal, then added complexity of the steering column mechanism would be required in the form of an electromechanical actuator to physically move the turn signal stalk to the center-off position. Both of these remedies add undue complexity and cost to the existing system.

What is needed, therefore, is an improvement to the turn signal system of a vehicle that takes into account many other dynamic factors of the vehicle when a turn is executed for greater turn signal control accuracy, as well as a method that simplifies the current state of the art.

SUMMARY OF THE INVENTION

It is an object to improve automated turn signal devices.

It is another object to reduce a potentially hazardous driving condition due to an unintentionally maintained-on turn signal.

It is a further object to reduce cost, size, complexity, wire count and weight in the turn signal mechanical apparatus on the steering column.

It is still another object to provide an "intelligent" turn signal shut off device which monitors a plurality of vehicle conditions to shut off an unintended "turn signal left on" condition.

It is another object to prevent a premature shut off of the turn signal.

It is another object to enable a situation-appropriate shut off of the turn signal.

It is further an object to provide an automated turn signal device which is controlled by a computer.

It is another object to enable a combination of a turn signal device with a four way hazard flasher device in an automobile.

It is another object to utilize real time wheel speed information from at least two wheels to control turn signal on/off status.

It is another object to provide a turn signal shut off device which adapts and adjusts shut off points based upon a driver's recent historical driving habits.

It is another object to enable a turn signal stalk design that improves aesthetics, tactile feel, and audible feedback.

It is another object to provide a turn signal system which is self canceling by rotation of the steering wheel.

It is another object to provide a turn signal system that is capable of cancellation by a manually operated control.

It is another object to provide a system which functions in both intelligent mode as well as "lane change" mode with the same physical motion from the driver on the stalk.

It is another object to automatically engage 4 way hazard or a modified 4 way hazard for a controlled duration upon activation of a vehicle's anti-lock brake mode.

It is another object to enable the integration of a traction control on/off switch within the turn signal stalk assembly.

Yet another object is that a variation in effective wheel diameter between sensor inputs, as in the case of a low pressure tire, be detectable and compensated for in software if deemed necessary.

It is another object to provide a signal that could be used for the horizontal axis aiming of an actuator driven headlight based upon conditionally computed steering wheel position data.

It is another object to re-activate turn signal function after shut-off if deemed necessary.

It is an object to enable diagnostics in a turn signal system that detect and alert of a failed or intermittent component.

It is another object to comply with Federal Motor Vehicle Safety Standards with respect to turn signals.

Accordingly, the present invention is directed to an intelligent turn signal control system. The system is comprised of two or more sensors providing continuous wheel speed data input to a software programmable computer. The computer also receives driver intended turn signal function data via a low current multiplex line from a driver interface switch assembly. A left control output and a right control output are each sent from the computer to a turn signal lamp actuation circuit that converts the low level computer output to high current outputs capable of separately driving left and right exterior and instrument cluster turn signal lamps loads. Utilizing the wheel speed data from two or more wheels and the inherent data differential thereof, software programmed in the computer is used to conditionally compute appropriate turn signal shut-off points.

Upon actuation of a turn signal from the driver interface switch, the software is capable of compiling and computing differential wheel data to determine valuable vehicle condition states, including vehicle yaw rotation, distance, speed, acceleration, arc turn radius, lateral acceleration, time and steering wheel angle. The data are conditionally computed to determine the appropriate shut off point of the turn signal, thus eliminating a premature shut off as well as a turn signal left on.

Intelligent software programmed into the computer detects the duration of the turn signal lever actuation as input from the driver interface switch assembly, discerning by short or long duration of the turn signal switch whether the driver intends a full self cancel mode turn signal or intends a "lane change". If a long duration of the switch is made, a "lane change" is called for and the turn signal is shut off upon release of the switch. If a short duration of switch actuation is made, then the self-cancel mode is indicated, then the software monitors vehicle velocity data inputs to determined whether the vehicle's velocity has dropped below a predetermined amount or whether wheel slippage is detected. If yes, the software applies a second set of rules which are better suited to an error potential condition and is discussed hereinafter. If no, software compiles a signal accumulated differential data pulse count indicative of the vehicle's relative distance traveled for a left tire and a right tire. This function determines total vehicle yaw rotation angle and then subsequently determines whether it has crossed a conditionally computed threshold vs. percentage velocity increase from local velocity minimum of the vehicle. If yes, the computer transmits an off signal to the turn-signal lamp actuation circuit, indicative of a sufficient vehicle yaw rotation for complete execution of the turn.

The software further calculates the realtime frequency ratio between left and right tires, computing a value that directly corresponds to realtime steering wheel position. The software computes a ratio for percentage of steering wheel returning from maximum steering wheel rotation excursion and compares it to a percentage velocity increase from local minimum. Upon exceeding a conditionally computed threshold, the computer transmits an off signal to the turn-signal lamp actuation circuit, indicative of a steering wheel returning towards a straight ahead position.

Further, if an extended straight-line travel has occurred and the vehicle has maintained a near steady state velocity, then a conditionally computed threshold will be exceeded whereby then the software transmits a turn signal off signal to the turn signal lamp actuation circuit, canceling an inadvertent turn-signal-left-on condition.

The software further detects whether the turn signal is manually canceled from the driver interface switch assembly or if the vehicle's ignition is turned off, wherein the software transmits a turn signal off signal to the turn signal lamp actuation circuit.

The software further detects if the opposite turn signal is activated, that is if right turn signal mode is on, and then a left turn is initiated, the software instantly cancels the right turn mode and commences a left turn algorithm.

Further, if the software detects that the driver has activated a four way flasher mode, then all turn signal function and computations are overridden and both right and left turn signals are simultaneously activated, emulating a four way flasher mode. The system is constructed such that this mode may be selected with or without the ignition on.

Another aspect of this invention is that the software can "learn" a driver's turn signal usage habits, based upon inputs from both the driver interface switch assembly and the wheel speed inputs and then adapt the conditional computations to create more accurate shut off points for subsequent turns.

Still another aspect of this invention is that if the system is electrically interfaced with a vehicle's Antilock Braking System (ABS). When the ABS is actuated to modulate the vehicle's brakes, the four way flashers can be actuated at a standard or a modified flash frequency to alert other drivers of the vehicle's extreme braking condition.

Other objects and advantages will be readily apparent to those skilled in the art upon viewing the drawings and reading the detailed description hereafter.

BRIEF DESCRIPTION OF THE DRAWINGS

FIG. 6 shows a pair of graphs which show turn signal shut off as a function of vehicle yaw turn vs. speed change from minimum and percentage of steering wheel change vs. speed change from minimum.

FIG. 7 depicts five different paths of travel for a vehicle.

FIG. 8 shows a table of distance and speed values corresponding to a turn type A shown in FIG. 7.

FIG. 9 shows a table of distance and speed values corresponding to a turn type B shown in FIG. 7.

FIG. 10 shows a table of distance and speed values corresponding to a turn type C shown in FIG. 7.

FIG. 11 shows a table of distance and speed values corresponding to a turn type D shown in FIG. 7.

FIG. 12 shows a table of distance and speed values corresponding to a turn type E shown in FIG. 7.

DETAILED DESCRIPTION OF THE PREFERRED EMBODIMENTS

Figure 1:
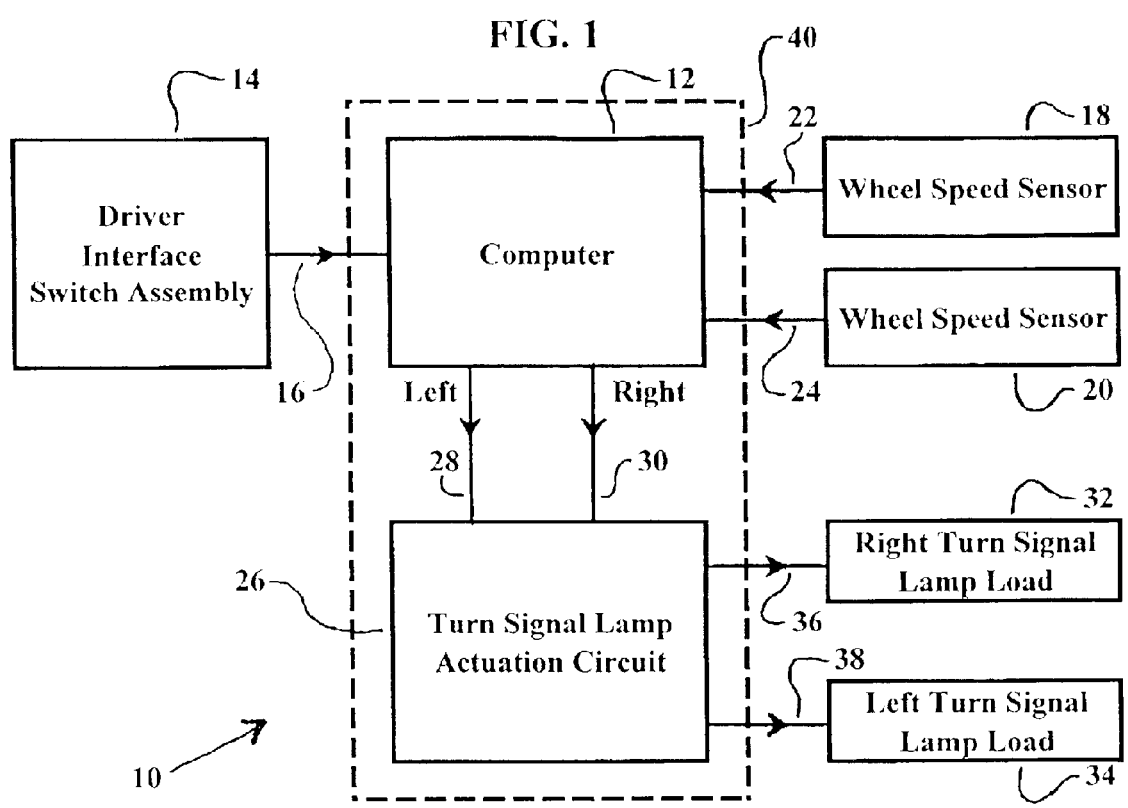
FIG. 1 illustrates a block diagram of intelligent turn signal control system for on/off function in a vehicle.

Referring now to the drawings, the intelligent turn signal control system 10 function block diagram in a vehicle is illustrated in FIG. 1. A computer, generally designated by the numeral 12, and can be of the type used in the art having a writeable, non-volatile memory for the storage of long term data and software programs which is operably connected to a vehicle to carry out the functions described herein. This computer 12 is equipped to determine the on/off status of the turn signal based upon inputs and computations. The actual turn signal flashing cycle, typically consisting of a 50% duty cycle on/off and 75 flash cycles per minute may be controlled by the computer 12 as well.

A driver interface switch assembly is designated by the numeral 14. This switch assembly 14 includes function controls for selecting the "right turn signal", selecting the "left turn signal", or selecting "cancel" which shuts off all turn signal function. These modes are each achieved by means of a momentary switch that resets to off upon release. Each signal level is considered low current, suited as an input to a computer. Additionally, a four-way hazard mode may be selected within this switch assembly 14. This switch assembly 14 can be an on/off two position switch that holds the function in the on position when switched on. This switch assembly 14 is operably connected to the computer 12 via a electrical connection, designated by the number 16. A form of multiplexing may be used and includes electrical connection 16 to minimize the wire count and wire gauge size for this electrical connection.

Output signals from at least two of the wheel speed sensors 18 and 20 are connected as input to the computer 12 via electrical connections designated by 22 and 24, respectively. These wheel speed sensors 18 and 20 are of the type commonly used in ABS/traction control systems and are affixed near the vehicle tire/wheel hub within sensing proximity to a rotating multi-toothed wheel, commonly known in the industry as a tone wheel. The output of the sensors 18 and 20 is in the form of an alternating current whose frequency corresponds to wheel speed.

A turn signal lamp actuation circuit, designated by the numeral 26, is a circuit that can receive low current computer output signals 28 and 30 and is subsequently capable of driving vehicle turn signal lamp loads, designated by 32 and 34. These lamp loads 32 and 34 are the exterior and instrument cluster turn signal indicator lights that are driven by the turn signal lamp actuation circuit 26 and are connected to the output of the turn signal lamp actuation circuit 26 by electrical connections 36 and 38, respectively.

This system 10 has a distinct and separate circuit for driving both left and right turn signals. It may however be advantageous to combine signals 28 and 30 into one multiplex signal, depending on the proximity of the computer 12 to the turn signal lamp actuation circuit 26. The electrical content of this circuit 26 can be of varied construction. Relay drive, solid state drive, or other means may be employed. Additionally, the flash cycle timing may be created by various means within the turn signal lamp actuation circuit 26.

It is conceivable and practical to combine the present invention to be integrated with an ABS/Traction control system of a vehicle, if so equipped. This would be achieved by utilizing the ABS/Traction control computer to function as the turn signal computer 12 in lieu of a dedicated computer. Additionally, it is conceivable and practical to integrate the turn signal lamp actuation circuit 26 into the ABS/Traction control computer as well, the combination of which is depicted in FIG. 1 as dashed line 40. This entails input and output considerations to accommodate the additional functions as compared to conventional ABS. In this scenario, four wheel speed sensors can be employed simultaneously to serve as inputs for both ABS function as well as the turn signal function. A traction control on/off function switch can be incorporated into the driver interface switch assembly 14, thereby reducing the overall wiring complexity on the vehicle. Wheel slip algorithm software can be shared between the turn signal computer software and the ABS/Traction control software.

All computations and examples shown herein are for a right hand turn as selected from the driver interface switch assembly 14. Similar computations and on/off modes can be made with respect to a driver selected left hand turn, and those skilled in the art can manipulate versions of that which is illustrated in the present invention to accommodate the algorithm, using the same subsystems of FIG. 1 and computing for a contrasting, yet equally performing left turn mode.

The system function described herein is that which would employ a left and a right wheel speed sensor. Although a front and a rear wheel could be utilized for computation purposes to accomplish similar performance results, such as in the case of a motorcycle, the system accuracy is greatly improved by the use of left/right sensing, due to the geometry of most vehicles. Further, to limit the amount of error compensation required for non-all wheel drive vehicles, it is preferred that the non-driven wheels in a two wheel drive vehicle would be used. Such is the case in a front wheel drive vehicle with the primary turn signal sensing occurring at the rear wheels. The present invention can, by programming of the computer 12, accommodate all vehicle variations such as full time all wheel drive vehicles, part time four wheel drive vehicles, four wheel steer vehicles, long wheel base buses, or heavy duty trucks.

Turn signal control is, as stated, controlled by specific software computations in combination with external inputs to the computer 12. The initialization point is defined as the point when the turn signal on mode is selected at the driver interface switch assembly 14, and where all values start at zero. Where used for computational purposes, maximum and minimum values are defined and established continuously starting from the initialization point and are reset when the turn signal is shut off.

The computations to control the on/off status of the vehicle's turn signal function are in part based on the following definitions:

The term "L" is defined as the wheel speed input from the left wheel. This is typically an alternating current signal of varying amplitude, whose frequency is a function of the number of teeth on the tone wheel, wheel circumference, and wheel speed. Its units are expressed in terms of pulse cycles per unit of time, such as cycles per second or as in FIGS. 8 through 12, expressed in cycles per half second.

The term "R" is defined as the wheel speed input from the right wheel. This is typically an alternating current signal of varying amplitude, whose frequency is a function of the tooth wheel count, wheel circumference, and wheel speed. Its units are expressed in terms of pulse cycles per unit of time, such as cycles per second or in FIGS. 8 through 12, expressed in cycles per half second.

The term "P" is defined as the pulse cycle count total from the left wheel, starting from the initialization point where P=0.

The term "S" is defined as the pulse cycle count total from the right wheel, starting from the initialization point where S=0.

The term "D" is defined as a modified vehicle distance, starting from the initialization point where P=0 and is represented by the equation:

$$D = \frac{P}{((L/R)_{max})^5}$$

The integer power of 5 is a value that is selected by the manufacturer to achieve the turn signal shut off performance desired.

Figure 2:
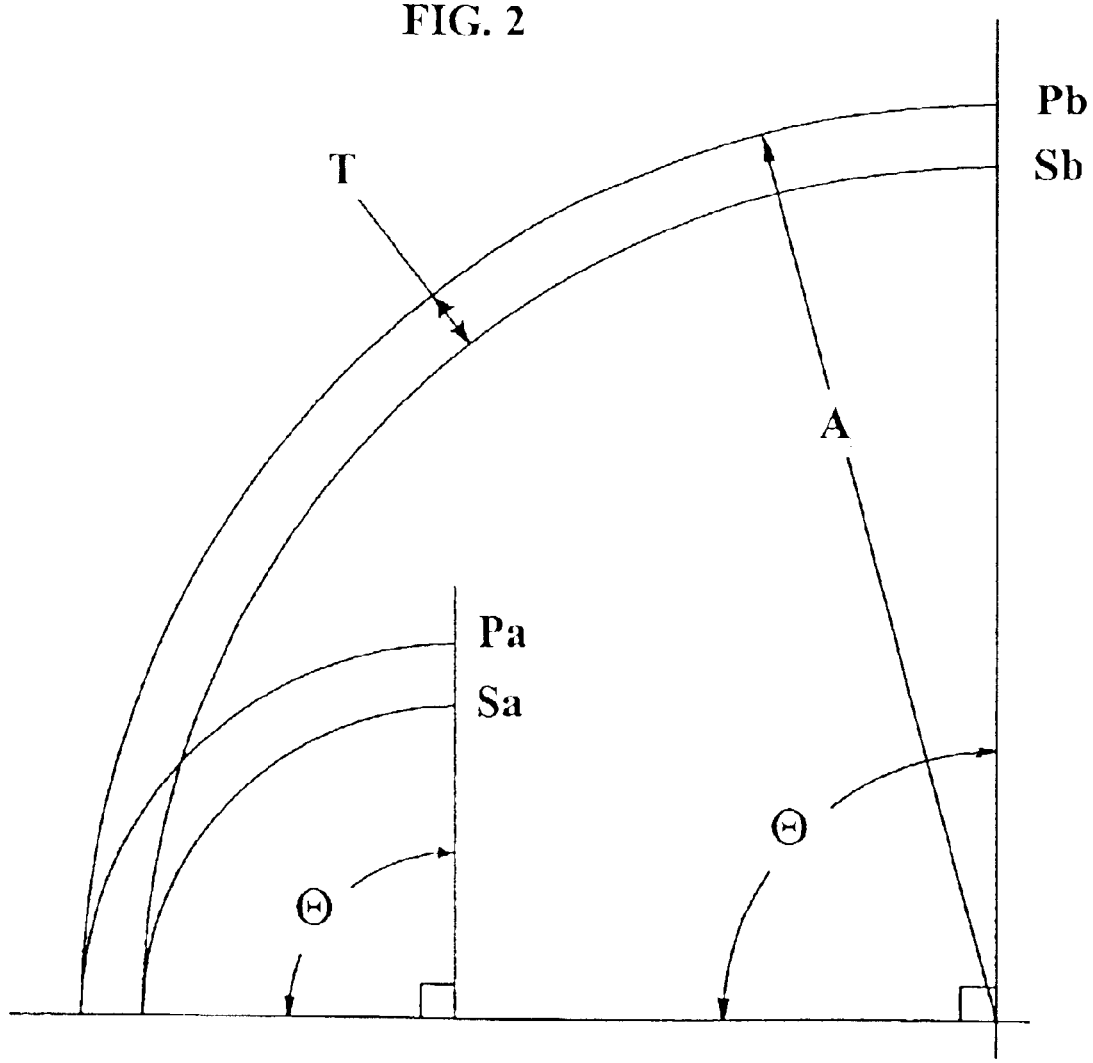
FIG. 2 depicts a yaw rotation relationship for two turns.
Figure 3:
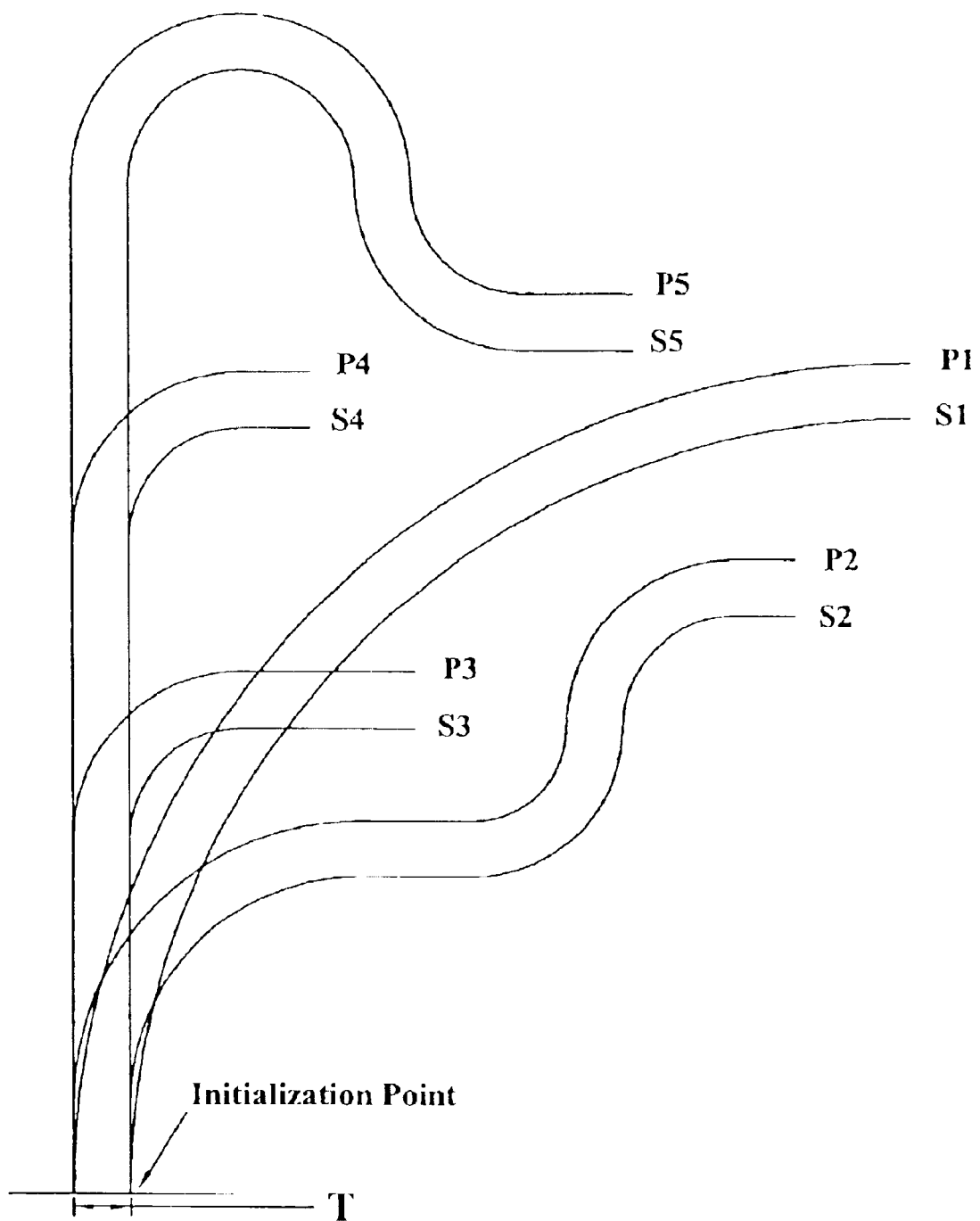
FIG. 3 depicts various different paths that result in a right turn of a vehicle.
Figure 4:
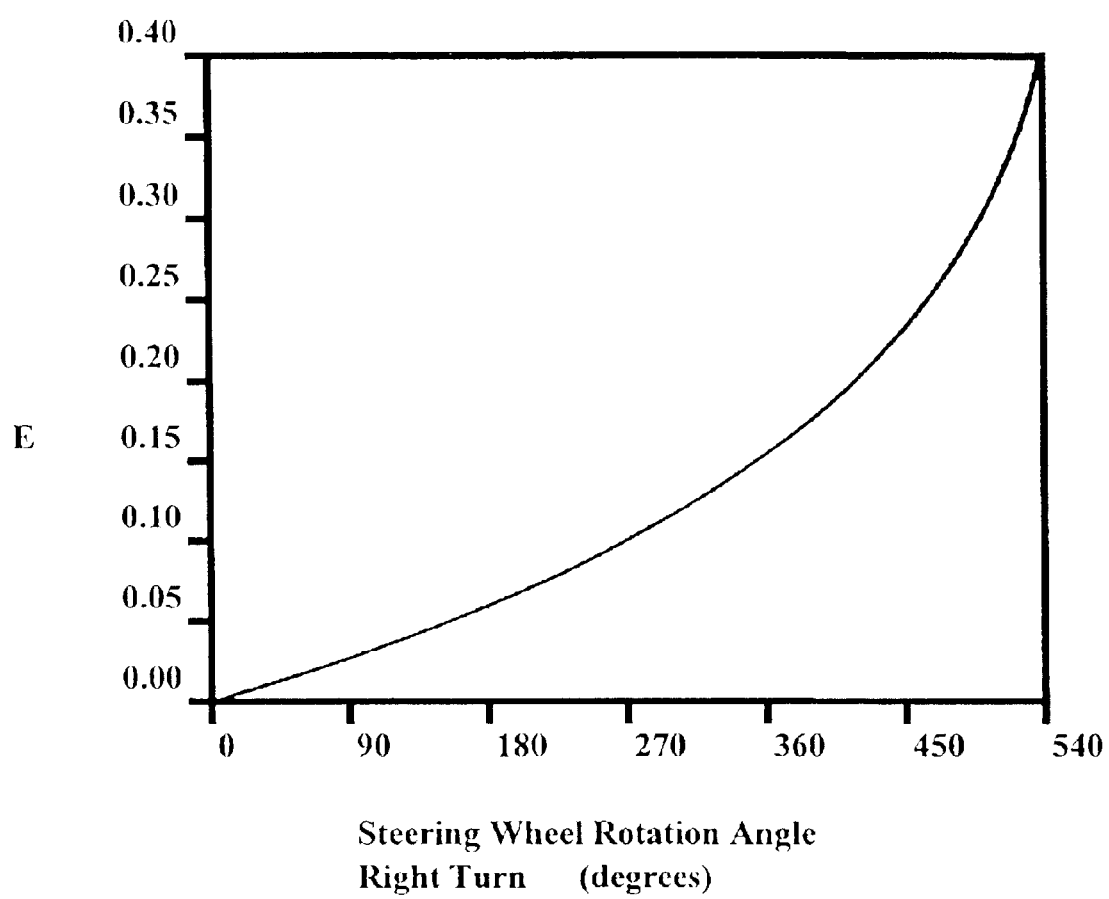
FIG. 4 depicts the relationship between steering wheel angle and wheel speed sensor inputs.

The term "Y" is the yaw angle of rotation from the initialization point, where Y=0. This could also be described as the vehicle's angular rotation about the vertical axis. FIG. 2 illustrates the relationship between a large arc turn and a small arc turn, representing the left tire and the right tires in each arc pair. In FIG. 2, the value of (Pb−Sb) of the large arc radius is equal to the value of (Pa−Sa) for the small arc radius, given that the angle of rotation Θ is equal. This would be true as well for any random path or distance taken to reach the same yaw rotation angle, as shown in FIG. 3. Note that the paths illustrated in FIG. 4 are used to represent the P and S relationship, and do not necessarily represent ideal turn signal shut off points of the present invention. The yaw angle Y is both positively and negatively cumulative and is illustrated in FIG. 3, where for all sets of wheel travel pairs of P and S, S subtracted from P would yield the same value, due to the resultant angle of yaw rotation being equal in each case. The total resultant angle of yaw rotation may therefore be derived using values of P and S. This is the case for any arc radius of any distance from the initialization point and can be described in the following equation:

$$\Theta = \frac{((P-S) \times 360)}{(2 \times \pi \times T \times C)}$$

Where Θ is the yaw angle of rotation described in degrees, π is a fixed value of pi approximately equal to 3.141592654. "T" is the track width of the vehicle or the linear distance between tire centers on the same axle, expressed in feet. "C" is equal to the number of teeth on the speed sensor tone wheel divided by the effective circumference of the tire, and would be expressed in teeth per foot. A simplified version to describe yaw in terms of degrees is as follows:

$$Y=(P-S) \times K$$

Where:

$$K = \left(\frac{360}{2 \times \pi \times T \times C}\right)$$

Steering wheel excursion is described as the angular rotation of the steering wheel from the straight-ahead position. There is a direct relationship between the function of L and R, and the position of the steering wheel. For every value of L divided by R as derived from the wheel speed sensors, there is a corresponding steering wheel position. This relationship is illustrated in FIG. 4 for a right hand turned steering wheel. The relationship is fixed and is defined by the manufacturer's steering geometry, including the vehicle's track width "T", steering assembly gear ratio and wheel base "W". The excursion term is defined as "E" and is described in the equation:

$$E=(L/R)-1$$

In the case where the steering wheel is in the straight-ahead position, L and R are equal and therefore L/R equals one and E therefore equals zero. In the case of a minimum radius turn of the vehicle, where L and R differential are at a maximum, the total range values of E might be, for example in one type vehicle, as high as 0.40, and as low as −0.29. This range is used to illustrate that the computation will yield a real time steering wheel position by processing values of L and R instantly and repeatedly.

The function of vehicle velocity "V" is computed using the L and R values, and is derived by the averaging the speed of L and R. The result may be scaled with a multiplier to units of distance per unit of time, such as miles per hour (mph) or feet per second (ft./sec.).

Arc turn distance "A" is the radius of the outside tracking wheel, which would be the left wheel in the case of a right hand turn. It is a direct function of the real time steering wheel position and is described in the following equation, where if T is expressed in feet, then A would be expressed in feet:

$$A = \frac{((L/R) \times T)}{E}$$

The term "G" or lateral acceleration of the vehicle on level ground can be easily and continuously computed and is described by the equation:

$$G = \frac{(V)^2}{(A \times g)}$$

Where V, A and g must be unit compatible, that is if V is expressed in feet per second, then A must be expressed in feet. The function "g" represents the acceleration of gravity and is equal to 32 feet per second squared. "G" is therefore expressed as a ratio of lateral acceleration to gravity, commonly referred to as "lateral G's".

Figure 5:
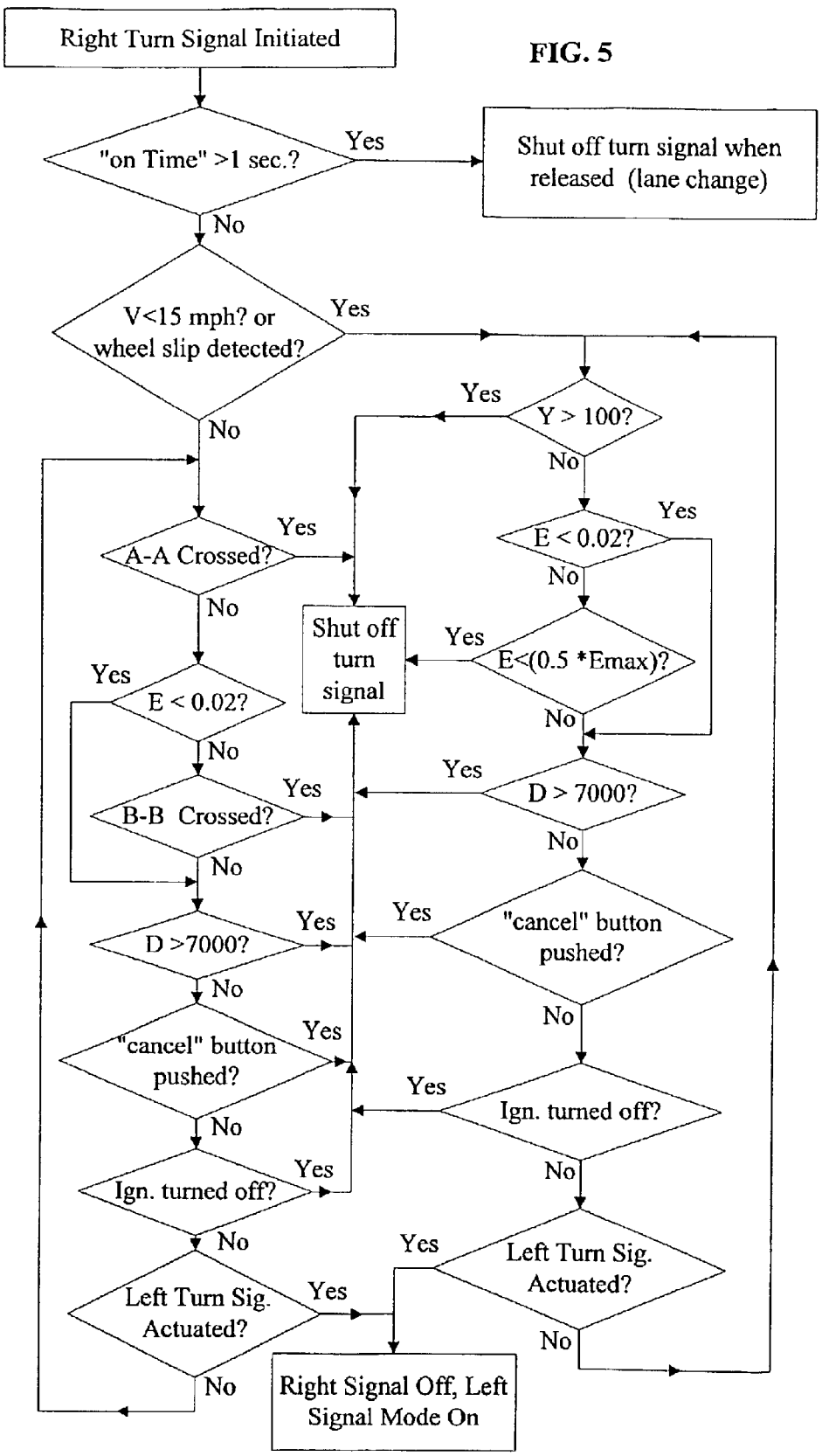
FIG. 5 illustrates a version of the flow chart of events used by the intelligent turn signal control system of the present invention.

Referring to FIG. 5, the computer 12 performs the following logic: Upon initiation of a right turn signal from the driver interface switch assembly 14, the computer 12 detects if the switch actuation duration is greater than a fixed duration, such as 1 second, thereby calling for a "lane change". If yes, then the computer 12 via output 30 sends an "on" signal to the turn signal lamp actuation circuit 26 for the duration that the right turn signal from the switch assembly 14 is held on. Upon release of the switch assembly 14, the "on" signal via output 30 is then shut off and then turn signals are shut off. If the driver interface switch assembly 14 calling for a right turn signal is activated for less than the fixed duration of one second, then the computer 12 determines if the vehicle velocity V has dropped below a predetermined amount, e.g. 15 mph, or whether wheel slippage has been detected by the computer 12 and the wheel speed sensors 44 and 46 since the initiation point. If yes, then the computer 12 applies a second set of rules which is discussed hereinafter.

If no, the computer 12 applies a first set of rules. The computer 12 determines whether the speed change V/Vmin verses yaw rotation Y has crossed a conditionally computed threshold A—A represented in FIG. 6. If yes, then the computer 12 via output instructs the turn signal lamp actuation circuit 26 to shut off the turn signal.

If no, the computer 12 determines whether E is less than a predetermined value, e.g. 0.02. If yes, the computer skips the next step. If no, the computer 12 determines the next step which is if the speed change V/Vmin verses E/Emax has crossed a conditionally computed threshold B—B represented in FIG. 6. If yes, then the computer 12 via output 30 instructs the turn signal lamp actuation circuit 26 to shut off the turn signal.

If no, then the computer 12 determines whether the conditionally computed value of D is greater than a predetermined value, e.g. 7000. If yes, then the computer 12 via output 30 instructs the turn signal lamp actuation circuit 26 to shut off the turn signal.

If no, then the computer 12 determines if the cancel mode has been initiated from the driver interface switch assembly 14. If yes, then the computer 12 via output 30 instructs the turn signal lamp actuation circuit 26 to shut off the turn signal.

If no, then the computer 12 determines if the vehicle ignition has been shut off. If yes, then the computer 12 via output 30 instructs the turn signal lamp actuation circuit 26 to shut off the turn signal.

If no, then the computer 12 determines if the left turn signal mode has been initiated by the driver interface switch assembly 14. If yes, then the computer 12 via output 30 instructs the turn signal lamp actuation circuit 26 to shut off the right turn signal, and subsequently initiates the left turn signal mode. If no, then the computer 12 repeats the decision flow for the first set of rules.

Now if the vehicle's velocity V has dropped below the predetermined amount, e.g. 15 mph, then the second set of rules applies. The computer 12 determines if Y is greater than a predetermined value, e.g. 100. If yes, then the computer 12 via output 30 instructs the turn signal lamp actuation circuit 26 to shut off the turn signal.

If no, then the computer 12 determines whether E is less than a predetermined value, e.g. 0.02. If yes, the computer skips the next step. If no, the computer 12 determines the next step which is if E is less than (½×Emax), that is, has the steering wheel excursion E moved a predetermined percentage e.g. ½ or 50% toward straight ahead. If yes, then the computer 12 via output 30 instructs the turn signal lamp actuation circuit 26 to shut off the turn signal.

If no, then the computer 12 determines if D is greater than a predetermined value, e.g. 7000. If yes, then the computer 12 via output 30 instructs the turn signal lamp actuation circuit 26 to shut off the turn signal.

If no, then the computer 12 determines if the cancel mode has been initiated from the driver interface switch assembly 14. If yes, then the computer 12 via output 30 instructs the turn signal lamp actuation circuit 26 to shut off the turn signal.

If no, then the computer 12 determines if the vehicle ignition has been shut off. If yes, then the computer 12 via output 30 instructs the turn signal lamp actuation circuit 26 to shut off the turn signal.

If no, then the computer 12 determines if the left turn signal mode has been initiated by the driver interface switch assembly 14. If yes, then the computer 12 via output 30 instructs the turn signal lamp actuation circuit 26 to shut off the right turn signal, and subsequently initiates the left turn signal mode.

If no, then the computer 12 repeats the decision flow for the second set of rules.

FIGS. 8–12 show sample data wheel speed input signals as well as computations based upon those inputs. FIGS. 8–12 correspond to various turn types that are depicted in FIG. 7.

FIG. 8 depicts the data stream for a right hand turn, represented in FIG. 7 as turn type A. In this turn, the turn signal would be shut off at approximately the 7 second point. However, had a wheel slip occurred during braking for instance, the shut off point would have been approximately 8 seconds. Both scenarios would be considered an appropriate shut off point.

FIG. 9 depicts the data stream for a 270 degree clover leaf turn onto a highway, represented in FIG. 7 as turn type B. In this case, the turn signal would shut off at the 7.5 second point, or part way through the 270 degree turn. In contrast, a conventional turn signal would not have shut off until the 14 second point, or may not have shut off at all if the steering wheel excursion "E" was sufficiently small, and would therefore be deemed inappropriately late in shutting off.

FIG. 10 depicts the data stream for a gradual right hand bend represented in FIG. 7 as turn type C. This case is one of the most difficult to predict because it could be a bend in the road as opposed to a turn. The turn signal computer 12 would give every chance for the turn to be made by standing ready to receive a greater steering wheel excursion "E", among other clues of a turn. In this case, no turn is made and the turn signal would shut off after approximately 11 seconds due to the value of "D".

If, in FIG. 10 for instance, the driver did then make a turn at the 15 second point, that is, after the turn signal is shut off, then the driver adapting software would extend the shutoff point "D" to a longer threshold in order to compensate for that driver's habits. This is one example of the adaptive feature.

The set of data in FIG. 10 could also be depicting the data stream for a right tire with low air pressure. In this case, error-compensating software within the computer 12 would detect a long term and constant "E" value differentiation as compared to the data from other wheel speed sensors. The computer 12 would then introduce a compensating multiplier to effectively equalize the wheel speed data when in fact the vehicle is traveling in a straight-ahead path.

FIG. 11 depicts the data stream from a high radius right hand turn represented in FIG. 7 as turn type D. In prior art systems, the ratchet mechanism is not enabled in order to shut off the turn signal due to the minimal steering wheel excursion. In this scenario, however, the present invention would shut off the turn signal at approximately the 17 second point, based upon the value of "D".

FIG. 12 depicts a merge to a right turn lane, then a full right turn after a stop, represented in FIG. 7 as turn type E. Due to the right, then left dither motions to merge into the right lane, the turn signal may be shut off at the 3 second point, that is, before the intended right turn is made. Though not described in detail herein, this could be a situation where the computer 12 could re-energize the turn signal after shut off if conditions of deceleration or a "Y" value returning to zero with a slow down are recognized. The re-starting of the turn signal is another intelligent mode that may be programmed in the computer 12, depending on the manufacturer. Also noteworthy in FIG. 12 is that the duration of stop time between 5.5 seconds and 9 seconds does not impact the shut off algorithm while the vehicle is stopped.

The present invention thus provides for an intelligent turn signal control that is aware of many vital vehicle conditions and therefore provide for situation appropriate control of the turn signal system. In addition to the examples of algorithms defined herein, sufficient information is derived from the driver interface switch assembly 14 and from the wheel speed sensors 18 and 20 to refine and enhance full operation of an intelligent turn signal control. The turn signal has two distinct modes: Lane change and fully automatic. Both of these modes are attained with the same driver interface switch assembly 14 in combination with the computer 12 to recognize the input desired via the electrical connection 16.

Artificial intelligence or fuzzy logic practices could be employed to further optimize function. Adaptive features could be made to tailor the function to the driver's turn signal usage habits. For instance, a driver may be in the habit of holding the turn signal stalk down for greater than 1 second, which would place the turn signal system into a "lane change" mode. After shut off, the compiling of data by the computer 12 would continue to occur. Then, upon the instance of a detected turn shortly after shut off, the computer 12 could decide to extend the one-second threshold to suit that driver's habits in any subsequent turn, thereby enhancing the overall automatic turn signal shut off function. An anticipatory adaptation that could occur is if the turn signal stalk is merely held down at a duration close to the threshold, e.g. 0.95 seconds, then the threshold would be adjusted to accommodate. Another example of an adaptive feature could be if the driver has the habit of turning on the turn signal a substantially long distance before the turn. In a normal case the computed value of "D" may shut off the turn signal. If, upon monitoring of the vehicle dynamics after the shut off, the computer 12 deems that the driver has made a turn, then the threshold for the shut off for a predetermined value of "D" may be extended in subsequent turn signal operations, again, adapting to suit that particular driver.

The computation and tracking of the value "D" may have many variations, such as the vehicle while in a slow down mode may want a reduction factor constant for the accumulation of "D". This would serve to provide a "wait" mode to see if the vehicle slowing down is tending towards a turn, and therefore delay the shut off.

The function of four way hazard flashers can be incorporated into the system function, integrating especially well when the turn signal computer 12 is part of the ABS system. If the antilock braking system is activated due to a maximum braking mode reached by the vehicle, in addition to modulating brake function, the computer 12 could activate both the left and the right turn signals at normal flashing cycle speed or at a faster than normal flash speed. This would have the effect of alerting other drivers in all directions that an extreme braking condition is occurring. Upon the ABS ceasing the brake modulation function on the vehicle, the flashers would cease as well. This passive safety feature has the potential to prevent an accident and may be added for minimal or no cost.

It is conceivable that cruise control may be an input to the turn signal computer 12. Upon actuation of the turn signal with the cruise control on, the duration of the driver interface switch assembly calling for a turn signal mode would be ignored. The turn signal would be held on for a fixed length of time, e.g. 4 seconds, indicating a lane change mode during a steady state speed condition. Although this is a possibility, it may not necessarily be cost effective to incorporate the information from the cruise control to enhance the overall performance.

The invention provides for a simplification of the current turn signal stalk assembly. One low current wire in place of the many high current wires are used, with the circuit completion made by battery + or −, depending on switch design. Two wires may also be used if manufacturer deems necessary. This invention also allows for a separation of the steering column from the turn signal control. The turn signal control could therefore become mounted from either the steering column or the instrument panel if so designed, and in both cases presented to the driver in the traditional left-of-steering-wheel position. This may improve vehicle assembly and allow component placement optimization. The switch design of the current invention is also physically smaller, thereby allowing greater flexibility of design of the space restricted instrument panel and steering column area. Additionally, it may be deemed a desirable feature by the manufacturer to provide redundant turn signal switch actuators on the left and right sides of the steering wheel, for instance, in addition to the traditional stalk. This may provide for the driver to activate the turn signal without having to take a hand off the steering wheel. Because the activation switch is electric only, parallel, redundant switches make this possible.

Minor differences with the turn signal stalk function would also be subtly different as compared to conventional systems. One difference would be that there would be the addition of a "cancel" button, possibly on the end of the stalk as a push button. This provides a driver's benefit due to the cancel button always presented in the same location for the driver. One button cancels any and all turn signal functions. Additionally, the turn signal lever itself is always in the same position, no matter what mode the turn signal is in. Again, this is a benefit provided to the driver with a predictable, constant-location turn signal stalk.

Tilt and telescope steering wheel mechanisms would not be required to be considerate of turn signal mechanisms in their design. Other functions may be easier to integrate as well, such as the high/low beam headlight selector, wiper control, and cruise control.

In the traditional turn signal systems, there are mechanical noises made and tactile feedback that the driver senses when both the turn on and the turn off of the turn signal. This is in part due to the fact that the vehicle designers must take into account the mechanism related to the current automatic shut off method. Because the hand stalk in the present invention has a singular task of the electrically activating a switch, the vehicle manufacturer may optimize tactile feel and audible feedback that has a perceived higher quality with enhanced ergonomics. An inaudible turn signal shut-off, or even an inaudible flash cycle mode is made possible by the present invention, further enhancing the overall driving experience and perception of quality. The use of solid state devices throughout the entire turn signal system is made more economical with the present invention and would therefore improve reliability as compared to current systems.

Performing a service function is made easier as well. If a replacement of the driver interface switch assembly is required, vehicle manufacturers can design for ease of service without compromising the design. Diagnostics built into the computer 12 can serve to alert where failures are occurring or have occurred, such as bulb failure, or switch failure. In the event of a wheel speed sensor 18 or 20 failure, the computer 12 could detect the failure and subsequently use the input from another functioning wheel speed sensor, one previously unused for turn signals. This would retain full function of the intelligent turn signal function. Durability of the system may be improved as well due to the simplicity of the switching in the current invention.

If the ABS/Traction Control computer is used as the computer 12, there is an overall cost saving potential in addition to the added function. Eliminating the numerous moving parts and complexity of manufacture of the current turn signal cancellation mechanism could represent a substantial overall reduction in cost, even when comparing the additional modifications required for the current invention.

The ability to shut off any turn signal functions when ignition is shut off is another unique benefit of the current invention. In the case where a vehicle is turning into a driveway or into a parking space and the turn signal is activated, the current invention provides for the vehicle to be shut off without the turn signal coming back on when the vehicle is restarted some time later.

Since wheel speed sensors do not indicate direction of travel, the current invention would function when the vehicle is in reverse. Although not necessarily a benefit, the same automatic shut off function and predictable operation occurs when in reverse.

The computation of turn signal control input terms described, such as the terms Y, G and A, may serve to eliminate other sensors used in vehicles today, in some cases for stability control or ride control. The value of E can be used in place of a steering wheel sensor device. The value of E can also be used to drive a horizontal pivoting headlamp actuator or cornering lights that track real time with the direction of the front wheels. The value of Y can be used to determine yaw rate for vehicle stability, thereby eliminating a yaw rate sensor component. The value of G may serve to eliminate a lateral accelerometer component.

The current invention is intended to comply with all Federal Motor Vehicle Safety Standards, specifically FMVSS 108, pertaining to vehicle lighting, and FMVSS 105 and 135, pertaining to braking systems. Additionally, the current invention is intended to comply with current Society of Automotive Engineers' standards and recommended practices pertaining to lighting and braking.

The above described embodiments are set forth by way of example and are not for the purpose of limiting the invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. An intelligent turn signal control system for turning off a turn-signal left on in a vehicle having turn-signal control and turn signal indicator, said control system comprising:
   sensors for providing differential wheel movement signals on the vehicle; and
   a computer operably disposed on the vehicle and connected to the turn signal control, wherein said computer is configured to receive a signal indicating that a turn-signal has been activated and transmit a turn-off signal to the turn-signal indicator upon having determined a turn completion, wherein said computer is operably connected to said sensors and is programmed to:
      determine when the turn-signal is activated,
      manipulate sensed differential wheel movement signals to determine when a predetermined differential wheel movement has occurred indicating a completed turn, and
      prevent a premature shut off of the turn signal.

2. The intelligent turn signal control system of claim 1, wherein said computer is further programmed to determine said predetermined differential wheel movement as a function of vehicle yaw rotation.

3. The intelligent turn signal control system of claim 1, wherein said computer is further programmed to determine said predetermined differential wheel movement as a function of steering wheel angle.

4. The intelligent turn signal control system of claim 1, wherein said computer is further programmed to determine said predetermined differential wheel movement as a function of a predetermined time.

5. The intelligent turn signal control system of claim 1, wherein said computer is operably connected to a cruise control of the vehicle and said computer is programmed to monitor cruise control function to determine turn signal completion.

6. The intelligent turn signal control system of claim 1, wherein said computer is programmed to determine a situation-appropriate shut off of said turn signal.

7. The intelligent turn signal control system of claim 1, wherein said computer is operably connected to a four way hazard flasher control to receive a signal indicating activation of four way hazard flasher and for transmitting a turn on signal to said turn signal indicator in a predetermined flash sequence.

8. The intelligent turn signal control system of claim 1, wherein said computer transmits a turn on signal to said turn signal indicator in response to said received signal from said turn signal control.

9. The intelligent turn signal control system of claim 1, wherein said computer is further programmed to determine said turn-off signal such that it adapts and adjusts shut off points based upon a driver's recent historical driving habits.

10. The intelligent turn signal control system of claim 1, wherein said computer is configured to receive deactivation signal from said turn signal control and transmit a turn-off signal to the turn signal indicator.

11. The intelligent turn signal control system of claim 1, wherein said computer is further programmed to automatically transmit a turn-on signal to said turn signal indicator in a flashing sequence to indicate four way hazard flasher upon sensing a hazardous condition.

12. The intelligent turn signal control system of claim 1, wherein said computer comprises an ABS computer.

13. The intelligent turn signal control system of claim 1, wherein said computer is further programmed to automatically monitor and diagnose said turn signal system, and wherein said computer can transmit a signal indicative of condition of connection thereto.

14. The intelligent turn signal control system of claim 12, wherein said computer is further programmed to automatically transmit a turn-on signal to said turn signal indicator in a flashing sequence to indicate four way hazard flasher upon sensing an anti-lock brake unsafe skidding condition in said wheels.

15. The intelligent turn signal control system of claim 14, wherein said computer is further programmed to automatically transmit a turn-off signal to said turn signal indicator after sensing an anti-lock brake safe condition in said wheels.

16. The intelligent turn signal control system of claim 1, wherein said computer is further programmed to automatically compensate for variation in effective wheel diameter differential.

17. An intelligent turn signal control system comprising:
   a computer operably disposed on a vehicle, said computer being programmed to control turn signal on/off status, wherein at least a portion of said programming is attributable to control software;
   at least two sensors configured to provide differential wheel sensor data to said computer, wherein said differential wheel sensor data comprises pulse count data, rolling distance data, or combinations thereof, attributable to left and right turning wheels of said vehicle, respectively;
   a turn signal driver interface assembly configured to send driver intent inputs to said computer; and
   a circuit configured to convert signals from said computer to signals sufficient to power vehicle turn signal lamps, wherein said computer is configured to determine vehicle yaw rate or cumulative yaw rotation as a function of wheel differential data and generate said signals as a function of said determined cumulative yaw rotation.

18. The intelligent turn signal control system of claim 17, wherein steering wheel position and steering system position and movement are determined by said software as a function of wheel differential data.

19. The intelligent turn signal control system of claim 17, wherein curved or straight line distance traveled are determined by said software as a function of wheel differential data.

20. The intelligent turn signal control system of claim 17, wherein said computer is operably connected to the cruise control system of the vehicle and said software monitors cruise control on/off status to control turn signal on/off status.

21. The intelligent turn signal control system of claim 17, wherein said software includes means for preventing a premature shut off of said turn signal.

22. The intelligent turn signal control system of claim 17, wherein said software includes means for determining a situation-appropriate shut off of said turn signal.

23. The intelligent turn signal control system of claim 17, wherein said computer is operably connected to a driver interface four way hazard flasher switch to receive on/off signals and for transmitting simultaneous left and right turn signals on/off to emulate four way hazard function on a vehicle.

24. The intelligent turn signal control system of claim 17, wherein said computer transmits a turn-signal-on command in response to a corresponding like-command from the driver interface assembly.

25. The intelligent turn signal control system of claim 17, wherein said computer transmits a turn-signal-off or cancel command in response to a corresponding like-command from the driver interface assembly.

26. The intelligent turn signal control system of claim 17, wherein said computer is further programmed to determine turn signal on/off function and modes based upon logic in said software which adapts and adjusts based upon a driver's recent historical driving habits.

27. The intelligent turn signal control system of claim 17, wherein all turn signal functions are reset to off upon vehicle ignition shut-off, such that the turn signal remain off when ignition is re-energized.

28. The intelligent turn signal control system of claim 17, wherein the driver interface includes redundant turn signal actuation controls on the steering wheel.

29. The intelligent turn signal control system of claim 17, wherein the driver interface assembly comprise bi-modal functions of "lane change" and "automatic shut off" modes as a function of momentary switch actuation duration.

30. The intelligent turn signal control system of claim 17, wherein said software includes means for automatically compensating for variation in effective wheel diameter between two or more vehicle wheels.

31. The intelligent turn signal control system of claim 17, wherein said software includes means for automatic monitor and diagnosis of said turn signal system components, wherein said computer can transmit a signal indicative of failed component.

32. The intelligent turn signal control system of claim 17, wherein said computer is the anti-lock brake computer in a vehicle.

33. The intelligent turn signal control system of claim 31, wherein said software includes means for controlling left and right on/off turn signals simultaneously at standard or high frequency flash rates, emulating a four-way flasher upon the commencement of an antilock braking event of the antilock braking computer.

34. An intelligent turn signal system comprising:
  a computer operably disposed on a vehicle, said computer being programmed to control turn signal on/off status;
  at least two sensors configured to provide differential wheel data attributable to left and right turning wheels of said vehicle;
  a turn signal driver interface assembly to send driver intent inputs to said computer, and
  a circuit configured to convert signals from said computer to signals sufficient to power vehicle turn signal lamps, wherein said computer is configured to determine a value representing vehicle steering wheel excursion as a function of wheel differential data and generate said signals for powering said turn signal lamps as a function of said differential wheel data and said driver intent inputs.

* * * * *

UNITED STATES PATENT AND TRADEMARK OFFICE
CERTIFICATE OF CORRECTION

PATENT NO. : 6,876,300 B2
DATED : April 5, 2005
INVENTOR(S) : Richard L. Ponziani It is certified that error appears in the above-identified patent and that said Letters Patent is hereby corrected as shown below:

Column 13,
Line 64, "shut off of said turn" should read -- shut off of the turn --.

Column 16,
Line 15, "of claim 31," should read -- of claim 32, --.

Signed and Sealed this

Sixth Day of September, 2005

JON W. DUDAS
*Director of the United States Patent and Trademark Office*